United States Patent
Umeda

(10) Patent No.: US 10,692,256 B2
(45) Date of Patent: Jun. 23, 2020

(54) VISUALIZATION METHOD, VISUALIZATION DEVICE, AND RECORDING MEDIUM

(71) Applicant: FUJITSU LIMITED, Kawasaki-shi, Kanagawa (JP)

(72) Inventor: Yuhei Umeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/175,006

(22) Filed: Oct. 30, 2018

(65) Prior Publication Data

US 2019/0156530 A1 May 23, 2019

(30) Foreign Application Priority Data

Nov. 21, 2017 (JP) ................................ 2017-223351

(51) Int. Cl.
*G06T 11/20* (2006.01)

(52) U.S. Cl.
CPC ................... *G06T 11/206* (2013.01)

(58) Field of Classification Search
CPC .................................................. G06T 11/206
USPC ............................................... 345/444, 440
See application file for complete search history.

(56) References Cited

U.S. PATENT DOCUMENTS

| | | | | |
|---|---|---|---|---|
| 2003/0193491 A1* | 10/2003 | Lawrence | ............ | G09G 3/3625 345/204 |
| 2006/0002614 A1* | 1/2006 | LeHenaff | ............... | G06K 9/481 382/242 |
| 2006/0210141 A1* | 9/2006 | Kojitani | ............... | G06K 9/6269 382/141 |
| 2011/0029817 A1 | 2/2011 | Nakagawa et al. | | |
| 2013/0304710 A1* | 11/2013 | Nachev | ................ | G06K 9/6284 707/690 |
| 2014/0095256 A1* | 4/2014 | Suzuki | ............... | G06Q 30/0201 705/7.29 |
| 2015/0125035 A1* | 5/2015 | Miyatani | ................ | B25J 9/1697 382/103 |
| 2016/0035093 A1* | 2/2016 | Kateb | .................. | A61B 5/0042 382/131 |
| 2018/0181802 A1* | 6/2018 | Chen | .................. | G06K 9/00201 |

FOREIGN PATENT DOCUMENTS

| | | |
|---|---|---|
| JP | 2007-279887 | 10/2007 |
| JP | 2011-34208 | 2/2011 |
| JP | 2013-535268 | 9/2013 |
| WO | WO 2012/013920 A1 | 2/2012 |

* cited by examiner

*Primary Examiner* — Ke Xiao
*Assistant Examiner* — Kim Thanh T Tran
(74) *Attorney, Agent, or Firm* — Xsensus LLP

(57) ABSTRACT

A non-transitory computer-readable recording medium stores therein a visualization program that causes a computer to execute a process including: generating a plurality of conversion vectors, from a plurality of vectors generated from plural pieces of input data, by a dimensional compression in a positional relation between the plurality of vectors; and plotting the plurality of conversion vectors.

9 Claims, 16 Drawing Sheets

VISUALIZATION METHOD, VISUALIZATION DEVICE, AND RECORDING MEDIUM

CROSS-REFERENCE TO RELATED APPLICATION

This application is based upon and claims the benefit of priority of the prior Japanese Patent Application No. 2017-223351, filed on Nov. 21, 2017, the entire contents of which are incorporated herein by reference.

FIELD

The embodiments discussed herein are related to a technology of visualizing data.

BACKGROUND

An abnormality has been detected based on data acquired time-sequentially (hereinafter, referred to as time series data). For example, in another method, an abnormality is determined whether it occurs based on a feature amount (for example, statistically amount) extracted from data in a normal state and a feature amount extracted from target data.

However, although an abnormality can be determined on whether it occurs by the above methods, it is difficult to determine whether an occurrence cause of the abnormality and a past cause of the abnormality are equal. For example, the time series data as illustrated in FIG. 1 is acquired. In FIG. 1, the value of the horizontal axis represents time, and the value of the vertical axis represents a value of a specific item. In FIG. 1, an abnormal state 11 and an abnormal state 12 occur, and the portions other than the abnormal state 11 and the abnormal state 12 are a normal state. If the above methods are used in the case of the example of FIG. 1, it is possible to detect that the abnormal state 11 and the abnormal state 12 occur. However, it is difficult to detect whether a cause of the abnormal state 11 and a cause of the abnormal state 12 are different (that is, a type of the abnormal state 11 and a type of the abnormal state 12 are different).

On the other hand, as a technique used to check a relation between data such as the time series data, there is known a multidimensional scaling which is a visualization technique of mapping data in a multidimensional space.

Patent Document 1: Japanese Laid-open Patent Publication No. 2011-34208

According to the multidimensional scaling, a type of the abnormality and another type of the abnormality can be visualized in a distinguishable pattern. However, in the multidimensional scaling, when recalculation is performed due to addition of new data, a positional relation between data is changed from a positional relation based on a calculation result at the time when the new data is not added.

FIGS. 2A to 2C is a diagram for describing the multidimensional scaling. In FIGS. 2B and 2C, Point 23 represents a point corresponding to reference data in FIG. 2A. Points other than Point 23 in FIG. 2B correspond to the time series data contained in a frame 21 Points other than Point 23 in FIG. 2C correspond to the time series data contained in a frame 22.

In this way, in the multidimensional scaling, when the input time series data is changed, the positional relation is changed even though the data is the same. Therefore, it is hard to continuously check a relation between the newly acquired data and the already acquired data.

SUMMARY

According to an aspect of the embodiment, a non-transitory computer-readable recording medium stores therein a visualization program that causes a computer to execute a process including: generating a plurality of conversion vectors, from a plurality of vectors generated from plural pieces of input data, by a dimensional compression in a positional relation between the plurality of vectors; and plotting the plurality of conversion vectors.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings.

[a] First Embodiment

Figure 3:
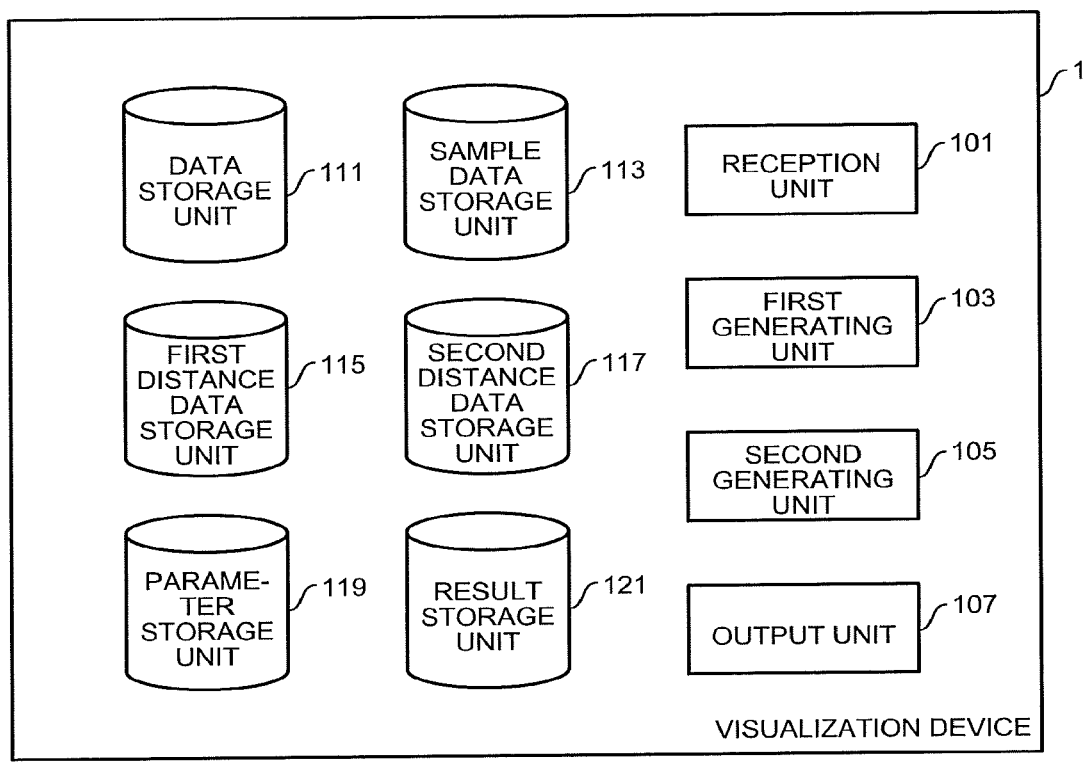
FIG. 3 is a functional block diagram of a visualization device in a first embodiment.

FIG. 3 is a functional block diagram of a visualization device 1 in a first embodiment. The visualization device 1 in the first embodiment includes a reception unit 101, a first generating unit 103, a second generating unit 105, an output unit 107, a data storage unit 111, a sample data storage unit 113, a first distance data storage unit 115, a second distance data storage unit 117, a parameter storage unit 119, and a result storage unit 121.

Figure 22:
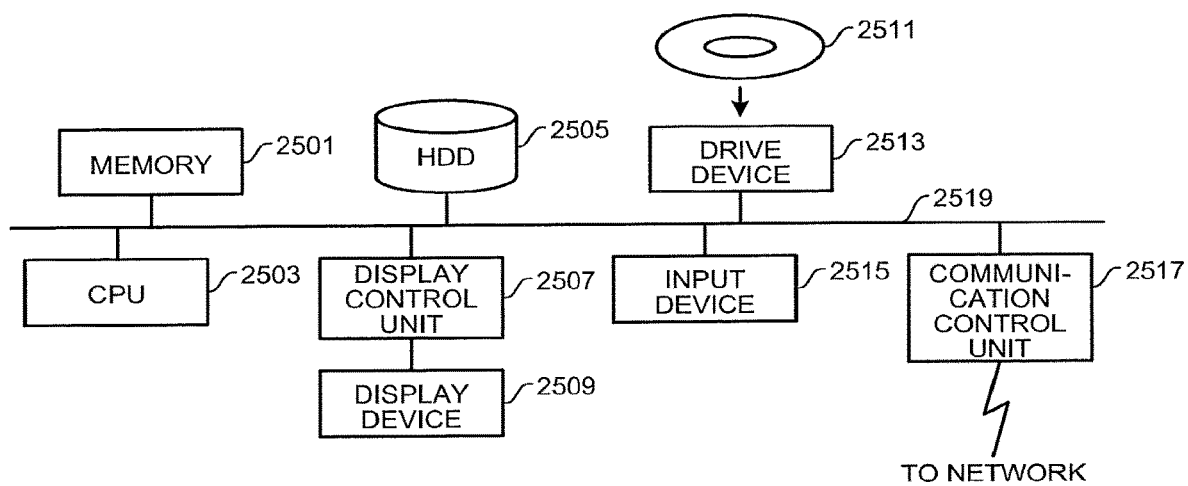
FIG. 22 is a functional block diagram of a computer.

The reception unit 101, the first generating unit 103, the second generating unit 105, and the output unit 107 are realized, for example, by executing a program stored in a memory 2501 in FIG. 22 by a central processing unit (CPU) 2503 in FIG. 22. The data storage unit 111, the sample data storage unit 113, the first distance data storage unit 115, the second distance data storage unit 117, the parameter storage unit 119, and the result storage unit 121 are provided in, for example, the memory 2501 or a hard disk drive (HDD) 2505 in FIG. 22.

The reception unit 101 stores time series data which is input or received from another device (for example, a gyro sensor, and the like) in the data storage unit 111. The time series data includes, for example, biological data (the time series data of heart rate, electroencephalogram, pulse, body temperature, and the like), data measured by a sensor (the time series data of gyro sensor, acceleration sensor, earth magnetism sensor, and the like), financial data (the time series data of interest, price, international balance of payment, stock price, and the like), natural environment data (the time series data of temperature, humidity, carbon dioxide concentration, and the like), or social data (data of labor statistics, population statistics, and the like).

The first generating unit 103 performs a process based on the data stored in the data storage unit 111, and stores a processing result in the sample data storage unit 113. In addition, the first generating unit 103 performs a process based on the data stored in the sample data storage unit 113, and stores a processing result in the first distance data storage unit 115. In addition, the first generating unit 103 performs a process based on the data stored in the first distance data storage unit 115, and stores a processing result in the parameter storage unit 119.

The second generating unit 105 performs a process based on the data stored in the data storage unit 111 and the data stored in the sample data storage unit 113, and stores processing result in the second distance data storage unit 117. In addition, the second generating unit 105 performs a process based on the data stored in the first distance data storage unit 115, the data stored in the second distance data storage unit 117, and the data stored in the parameter storage unit 119, and stores a processing result in the result storage unit 121.

The output unit 107 generates display data based on the data stored in the result storage unit 121, and performs a process (for example, a process of displaying data in a display device) of outputting the generated display data.

Next, a process performed by the visualization device 1 in the first embodiment will be described using FIGS. 4 to 12.

Figure 4:
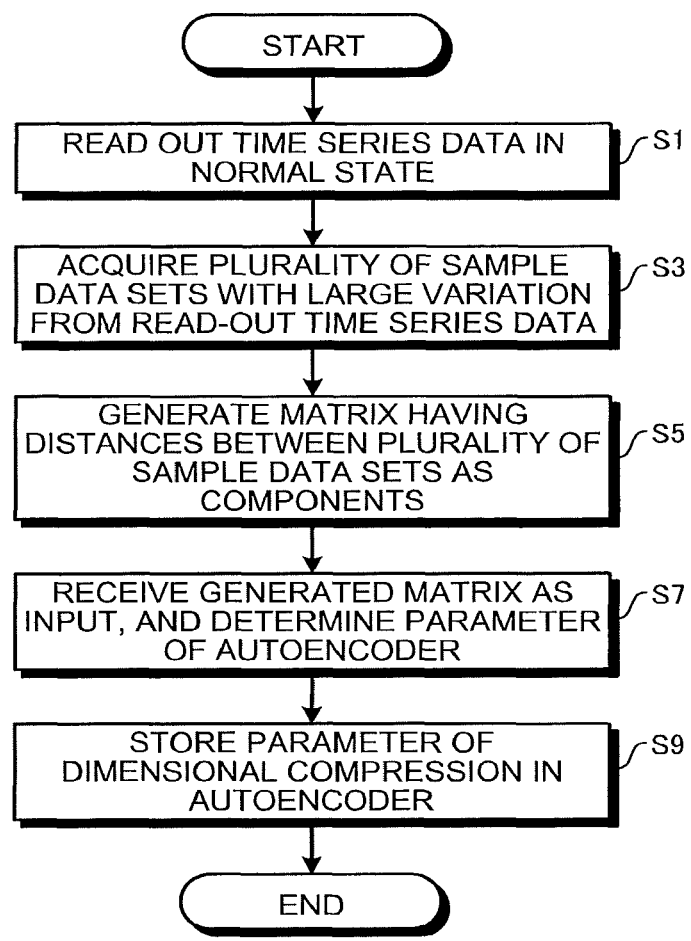
FIG. 4 is a diagram illustrating a processing flow of a process which is performed by a first generating unit in the first embodiment.

FIG. 4 is a diagram illustrating a processing flow of a process which is performed by the first generating unit 103 in the first embodiment.

First, the first generating unit 103 reads out the time series data in a normal state from the data storage unit 111 (FIG. 4: Step S1). The time series data includes a portion in a normal state and a portion in an abnormal state. The first generating unit 103 receives a portion (for example, period) in a normal state which is designated from a user, and reads out the time series data of the designated portion. There may be a plurality of designated portions.

The first generating unit 103 acquires a plurality of sample data sets with a large variation from the time series data read out in Step S1 (Step S3), and stores the plurality of acquired sample data sets in the sample data storage unit 113. The sample data set is time series data having a predetermined length for example.

Figure 5:
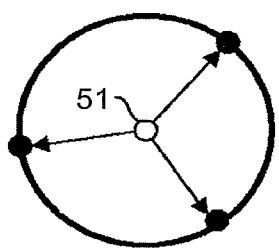
FIG. 5 is a diagram illustrating a relation between a sample data set and a data set.
Figure 6:
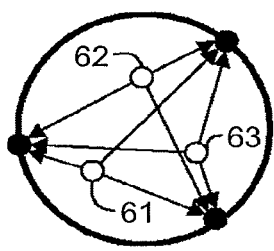
FIG. 6 is a diagram illustrating a relation between the sample data set and the data set.

The reason for acquiring the plurality of sample data sets is because a difference in characteristics of the data set hardly appears if there is one index value indicating the data set. FIG. 5 is a diagram illustrating a relation between one sample data set and a plurality of data sets. Point 51 in FIG. 5 is a point indicating the sample data set, and the other points are the target data set. As illustrated in the example of FIG. 5, in a case where the number of sample data sets is one, and if a distance from the sample data set (for example, Euclidean distance) is set to an index value, there is a possibility that it is determined that the three points have the same characteristic even when the characteristics of three data sets are different. On the other hand, as illustrated in FIG. 6, in a case where there are Points 61 to 63 indicating the sample data set, each data set can be expressed using the plurality of distances as the index values. Therefore, there is a possibility that a difference between the characteristics of the three data sets can be detected.

In addition, setting the variation of the plurality of sample data sets large contributes to that the difference in characteristics of the respective data sets easily appears. As a method of acquiring the plurality of sample data sets with a large variation, there is the following method for example. Specifically, the first generating unit 103 calculates distances between all the sample data sets, and specifies a combination of the same data sets of which the distance is a maximum. The first generating unit 103 retrieves each of two sample data sets in the combination from the beginning in a descending order of the distance to the other sample data sets. The first generating unit 103 specifies a sample data set of which the timing comes first when a distance from one sample data set appears and a distance from the other sample data set also appears. Subsequently, the first generating unit 103 performs the similar process on three sample data sets, the specified sample data set and the two sample data sets. Further, the first generating unit 103 performs a similar process until the number of sample data sets reaches a predetermined number.

Figure 7:
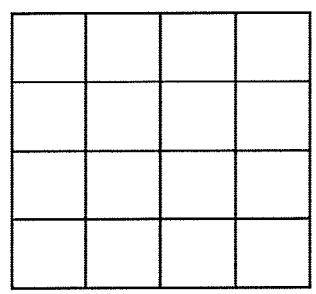
FIG. 7 is a diagram illustrating an example of a matrix with distances between a plurality of sample data sets as components.

Returning to the explanation of FIG. 4, the first generating unit 103 reads out the plurality of sample data sets acquired in Step S3 from the sample data storage unit 113. Then, the first generating unit 103 generates a matrix having the distances between the plurality of sample data sets as components (Step S5), and stores the generated matrix in the first distance data storage unit 115. For example, in a case where the number of sample data sets is "4", a 4×4 matrix as illustrated in FIG. 7 is generated. Square patterns indicate the components of the matrix. A diagonal component of the matrix indicates a distance between the same sample data sets, and thus "0".

Figure 8:
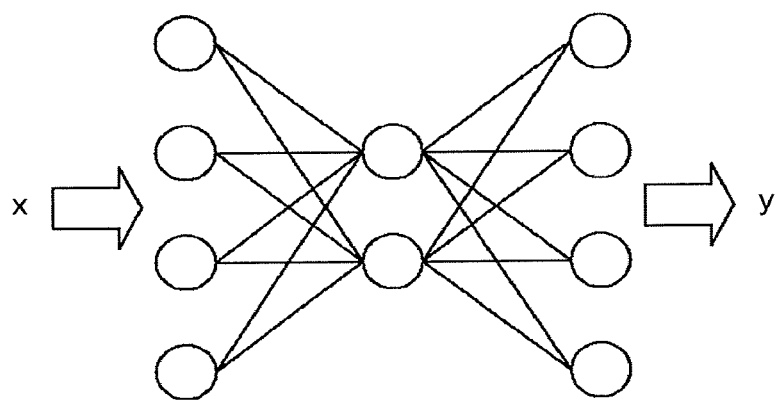
FIG. 8 is a diagram illustrating an example of an autoencoder.

The first generating unit 103 receives a matrix stored in the first distance data storage unit 115, and calculates a parameter of an autoencoder (Step S7). The parameter of the autoencoder includes, for example, a weight and a bias of an encoding in the autoencoder, and a weight and a bias of a decoding in the autoencoder. In Step S7, a parameter is calculated such that an error between the input "x" and the output "y" of the autoencoder becomes minimized. For example, as illustrated in FIG. 7, in a case where the matrix is a 4×4 matrix and two-dimensional after compression, the parameter of the autoencoder as illustrated in FIG. 8 is calculated.

The first generating unit 103 stores the parameter of the encoding in the autoencoder in the parameter storage unit 119 (Step S9). Then, the process ends. In the case of the autoencoder illustrated in FIG. 8, the encoding is performed in the portion surrounded by a frame 91 illustrated in FIG. 9. Therefore, a parameter of the portion surrounded by the frame 91 is stored.

As described above, if the parameter of the encoding in the autoencoder (that is, dimensional compression) is stored, the similar dimensional compression may be performed later using the parameter. With this configuration, it is possible to keep a positional relation between the plurality of points.

Figure 10:
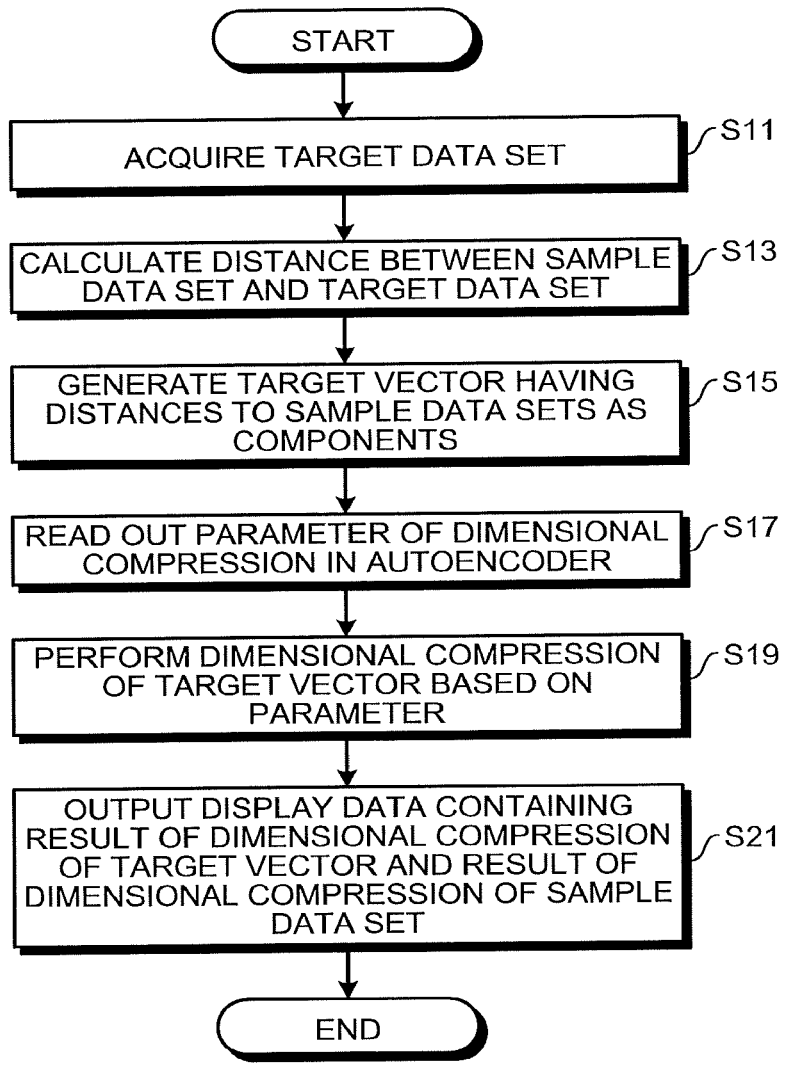
FIG. 10 is a diagram illustrating a processing flow of a process which is performed by a second generating unit and an output unit.

FIG. 10 is a diagram illustrating a processing flow of a process which is performed by the second generating unit 105 and the output unit 107. This process is performed after the first generating unit 103 performs the process. In addition, actually the process is performed in plural times to visualize a plurality of target vectors. However, for the sake of simplicity in explanation, the description below will be given about an example of the process of one target vector.

The second generating unit 105 acquires a target data set (for example, part of time series data which is newly acquired) from the time series data stored in the data storage unit 111 (FIG. 10: Step S11). The target data set may be a data set which is designated from the user.

The second generating unit 105 reads out the plurality of sample data sets stored in the sample data storage unit 113. Then, the second generating unit 105 calculates a distance between each of the plurality of read-out sample data sets and the target data set (Step S13). For example, in a case where the number of sample data sets is "4", four distances are calculated.

Figure 11:
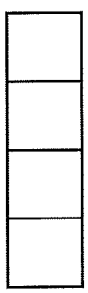
FIG. 11 is a diagram illustrating an example of a target vector.

The second generating unit 105 generates a target vector which has the distances calculated in Step S13 as components (Step S15), and stores the generated target vector in the second distance data storage unit 117. For example, in a case where the number of sample data sets is "4", a column vector is generated as illustrated in FIG. 11. In FIG. 11, a square pattern indicates a component of the target vector.

The second generating unit 105 reads out a parameter of the dimensional compression in the autoencoder from the parameter storage unit 119 (Step S17).

Figure 9:
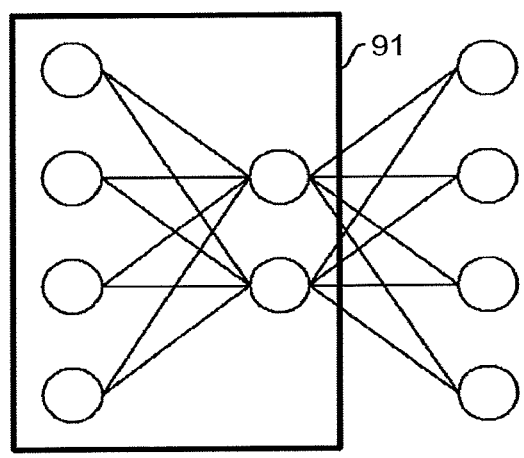
FIG. 9 is a diagram illustrating a portion where an encoding in the autoencoder is performed.

The second generating unit 105 performs the dimensional compression of the target vector stored in the second distance data storage unit 117 based on the parameter read out in Step S17 (Step S19), and stores the vector generated by the dimensional compression to the result storage unit 121. For example, in a case where the target vector is a column vector as illustrated in FIG. 11 and the dimensional compression illustrated by the frame 91 of FIG. 9 is performed, the target vector is converted into a two-dimensional vector.

The second generating unit 105 performs the dimensional compression of each column vector in the matrix stored in the first distance data storage unit 115 based on the parameter read out in Step S17, and stores the vector generated by the dimensional compression in the result storage unit 121. Then, the output unit 107 generates display data which includes the result of the dimensional compression of the target vector stored in the result storage unit 121 and the result of the dimensional compression of the column vector included in the matrix stored in the first distance data storage unit 115, and outputs the generated display data (Step S21). Then, the process ends.

As described above, a conversion rule (that is, the parameter of the dimensional compression) is not generated at every time when the data is acquired and dimensionally compressed, the positional relation of the plurality of plotted vectors is kept if a pre-generated conversion rule is used. With this configuration, the relation between the data sets can be easily checked.

Figure 1:
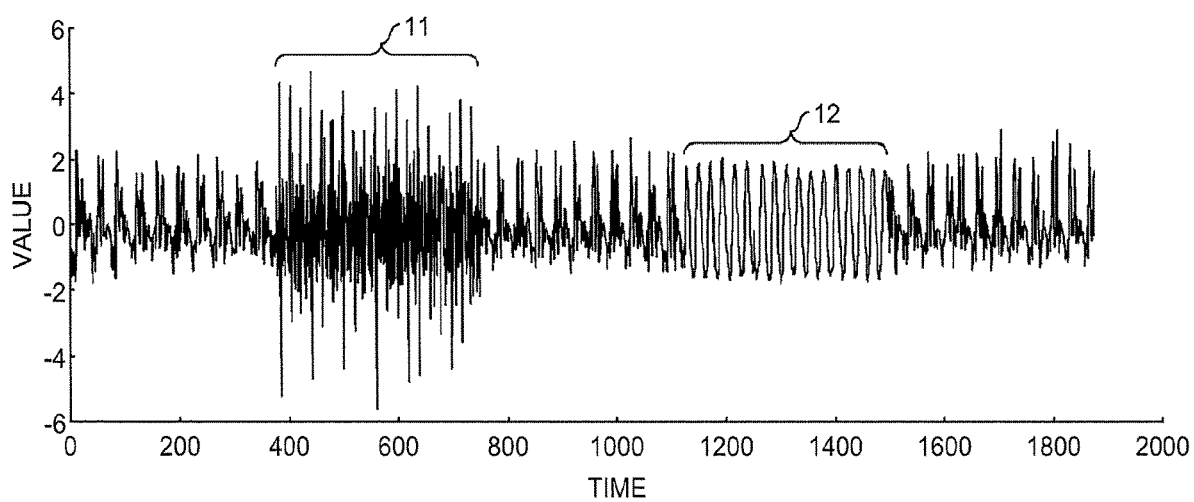
FIG. 1 is a diagram illustrating an example of time series data.
Figure 2A:
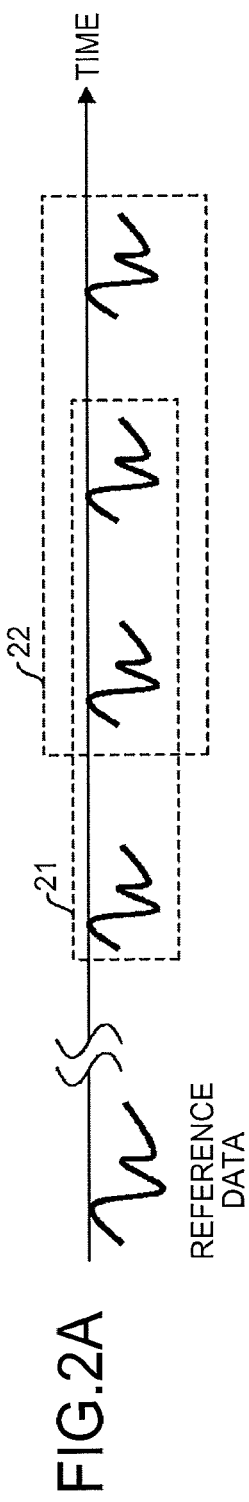
FIGS. 2A to 2C are diagrams for describing a multidimensional scaling.
Figure 2B:
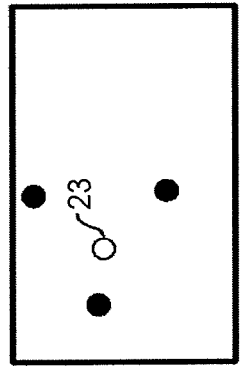
Figure 2C:
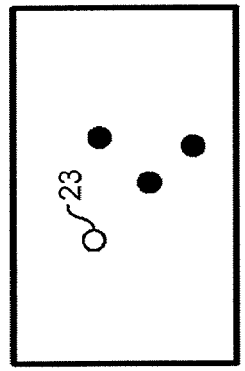
Figure 12:
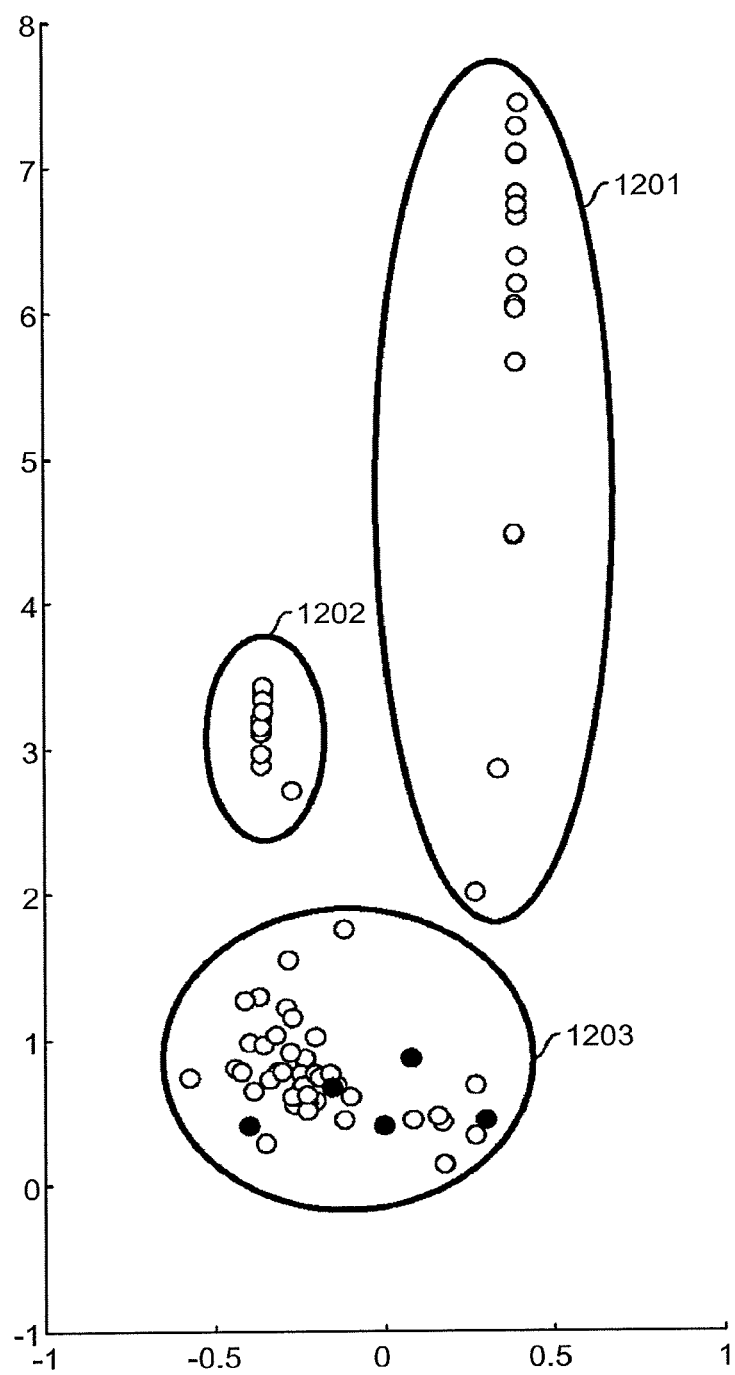
FIG. 12 is a diagram illustrating an example of a display based on display data.

FIG. 12 is a diagram illustrating an example of a display based on the display data. The example of FIG. 12 is an example in a case where the vector generated by the dimensional compression is a two-dimensional vector. In FIG. 12, the value of the horizontal axis represents a one-dimensional value, and the value of the vertical axis represents a two-dimensional value. Points surrounded by a frame 1201 correspond to the abnormal state 11 in FIG. 1, points surrounded by a frame 1202 correspond to the abnormal state 12 in FIG. 1, and points surrounded by a frame 1203 correspond to the portion other than the abnormal state 11 and the abnormal state 12 in FIG. 1 (that is, normal state). The hatched points among the points surrounded by the frame 1203 correspond to the sample data set.

According to this embodiment, as illustrated in FIG. 12, the vector corresponding to the abnormal state 11 and the vector corresponding to the abnormal state 12 are illustrated in different regions. Therefore, it can be seen that the abnormal state 11 and the abnormal state 12 are different types of abnormalities. In addition, the vectors corresponding to the normal state are displayed in a region different from the region where the vector corresponding to the abnormal state 11 is plotted and from the region where the vector corresponding to the abnormal state 12 is plotted. Therefore, according to the first embodiment, the user can easily check the relation between the data sets.

In addition, even when a new point is added to a distribution of the state illustrated in FIG. 12, the positional relation of the already plotted points is not changed unlike a case where a multidimensional scaling is used. Therefore, it is possible to easily check a relation between the data set corresponding to the new point and the data set corresponding to the already plotted points in real time.

[b] Second Embodiment

While the conversion rule of the dimensional compression is the parameter of the autoencoder in the first embodiment, the conversion rule of the dimensional compression may be used for parameters other than the parameter of the autoencoder. As an example of using other conversion rules, a method of using information of a main component vector of a main component analysis will be described below.

Figure 13:
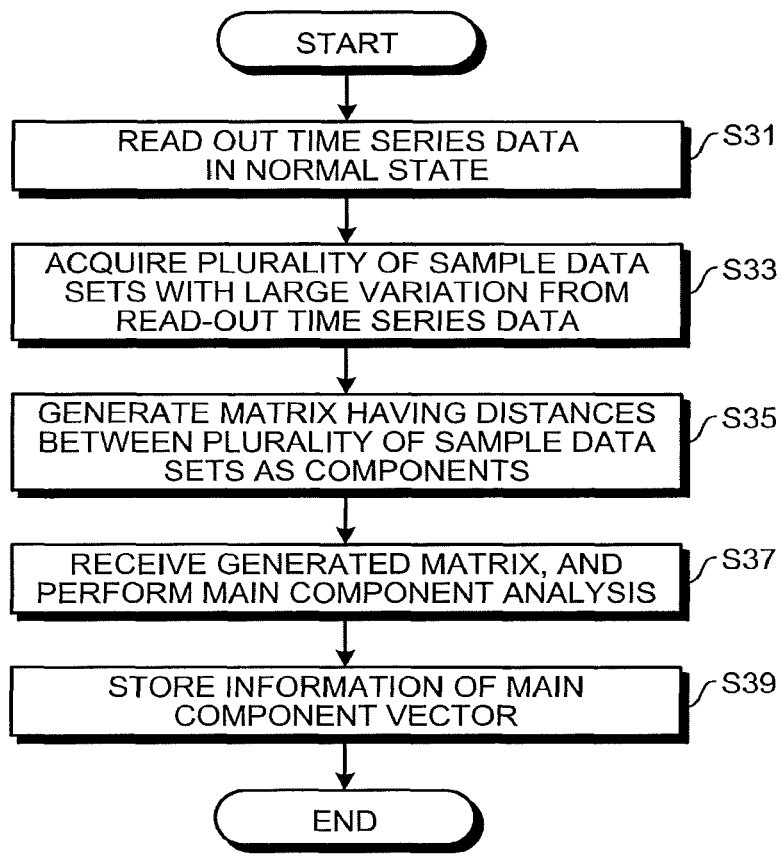
FIG. 13 is a diagram illustrating a processing flow of a process which is performed by a first generating unit in a second embodiment.

FIG. 13 is a diagram illustrating a processing flow of a process which is performed by the first generating unit 103 in a second embodiment.

First, the first generating unit 103 reads out the time series data in a normal state from the data storage unit 111 (FIG.

13: Step S31). The time series data includes a portion in a normal state and a portion in an abnormal state. The first generating unit 103 receives a portion (for example, period) in a normal state which is designated from a user, and reads out the time series data of the designated portion. There may be a plurality of designated portions.

The first generating unit 103 acquires a plurality of sample data sets with a large variation from the time series data read out in Step S31 (Step S33), and stores the plurality of acquired sample data sets in the sample data storage unit 113. The sample data set is time series data having a predetermined length for example.

The first generating unit 103 reads out the plurality of sample data sets acquired in Step S33 from the sample data storage unit 113. Then, the first generating unit 103 generates a matrix having the distances between the plurality of sample data sets as components (Step S35), and stores the generated matrix in the first distance data storage unit 115.

The first generating unit 103 receives a matrix stored in the first distance data storage unit 115, and performs the main component analysis (Step S37). The result of the main component analysis includes information, for example, an Eigen value, a contribution rate, and a main component load.

The first generating unit 103 stores information (for example, information such as a main component load) of the main component vector which is included in the result of the main component analysis in Step S37 in the parameter storage unit 119 (Step S39). Then, the process ends.

As described above, if the information of the main component vector is stored, it is possible to perform a similar dimensional compression using the information later.

[c] Third Embodiment

The number of types of the normal state may be two or more. In such a case, if a general abnormality detection method is applied, an abnormal score may be a median value of scores of the two normal states, and thus it is hard to discriminate. Therefore, the description in the following will be given about a process which is performed in a case where there are two or more normal states.

Figure 14:
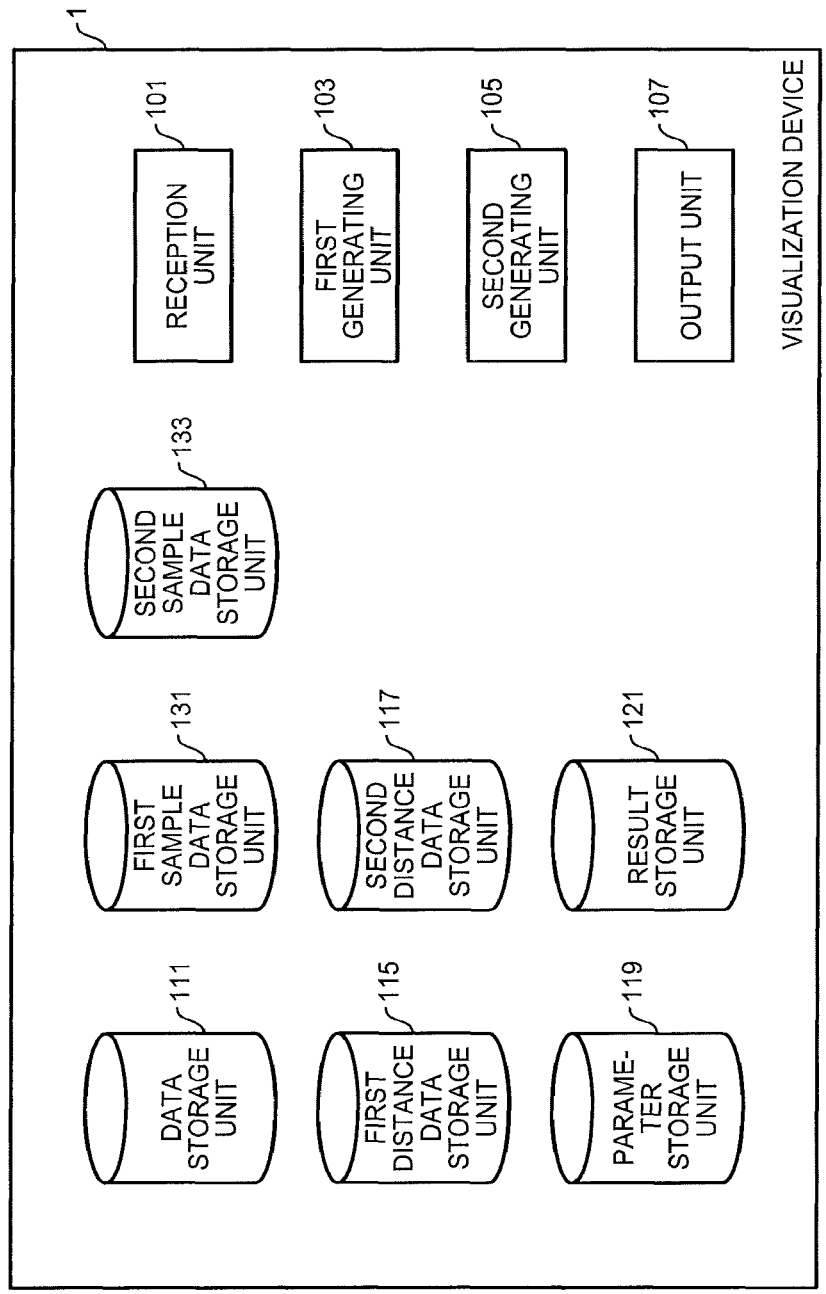
FIG. 14 is a functional block diagram of a visualization device in a third embodiment.

FIG. 14 is a functional block diagram of the visualization device 1 in a third embodiment. The visualization device 1 in the third embodiment includes the reception unit 101, the first generating unit 103, the second generating unit 105, the output unit 107, the data storage unit 111, a first sample data storage unit 131, a second sample data storage unit 133, the first distance data storage unit 115, the second distance data storage unit 117, the parameter storage unit 119, and the result storage unit 121.

The reception unit 101, the first generating unit 103, the second generating unit 105, and the output unit 107 are realized by executing the program stored in, for example, the memory 2501 by the CPU 2503. The data storage unit 111, the first sample data storage unit 131, the second sample data storage unit 133, the first distance data storage unit 115, the second distance data storage unit 117, the parameter storage unit 119, and the result storage unit 121 are provided in the memory 2501 or the HDD 2505 for example.

The reception unit 101 stores the time series data input or received from another device (for example, a gyro sensor, and the like) in the data storage unit 111.

The first generating unit 103 performs a process based on the data stored in the data storage unit 111, and stores a processing result in the first sample data storage unit 131 and the second sample data storage unit 133. In addition, the first generating unit 103 performs a process based on the data stored in the first sample data storage unit 131 and the data stored in the second sample data storage unit 133, and stores a processing result in the first distance data storage unit 115. In addition, the first generating unit 103 performs a process based on the data stored in the first distance data storage unit 115, and stores a processing result in the parameter storage unit 119.

The second generating unit 105 performs a process based on the data stored in the data storage unit 111, the data stored in the first sample data storage unit 131, and the data stored in the second sample data storage unit 133, and stores the processing result in the second distance data storage unit 117. In addition, the second generating unit 105 performs a process based on the data stored in the first distance data storage unit 115, the data stored in the second distance data storage unit 117, and the data stored in the parameter storage unit 119, and stores a processing result in the result storage unit 121.

The output unit 107 generates display data based on the data stored in the result storage unit 121, and performs a process (for example, a process of displaying data in a display device) of outputting the generated display data.

Figure 15:
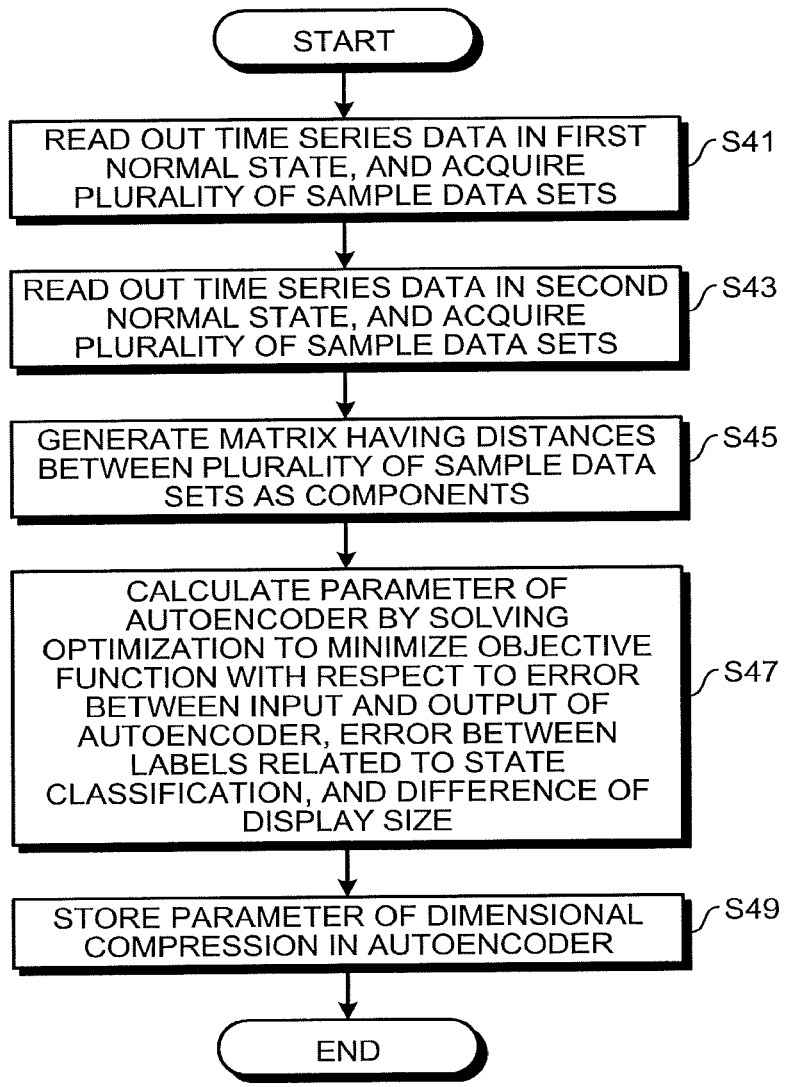
FIG. 15 is a diagram illustrating a processing flow of a process which is performed by a first generating unit in the third embodiment.

FIG. 15 is a diagram illustrating a processing flow of a process which is performed by the first generating unit 103 in the third embodiment. Herein, there are two types of the normal states.

First, the first generating unit 103 reads out the time series data in a first normal state in the two normal states from the data storage unit 111. Then, the first generating unit 103 acquires the plurality of sample data sets with a large variation from the read-out time series data (FIG. 15: Step S41), and stores the plurality of acquired sample data sets in the first sample data storage unit 131. In Step S41, the first generating unit 103 receives a portion (for example, period) in the first normal state which is designated from the user, and reads out the time series data of the designated portion. There may be a plurality of designated portions.

The first generating unit 103 reads out the time series data in a second normal state in the two normal states from the data storage unit 111. Then, the first generating unit 103 acquires the plurality of sample data sets with a large variation from the read-out time series data (Step S43), and stores the acquired plurality of sample data sets in the second sample data storage unit 133. In Step S43, the first generating unit 103 receives a portion (for example, period) in the second normal state which is designated from the user, and reads out the time series data of the designated portion. There may be a plurality of designated portions.

The first generating unit 103 reads out the plurality of sample data sets acquired in Steps S41 and S43 from the first sample data storage unit 131 and the second sample data storage unit 133. Then, the first generating unit 103 generates a matrix having the distances between the plurality of sample data sets as components (Step S45), and stores the generated matrix in the first distance data storage unit 115.

The first generating unit 103 solves an optimization in which an objective function is minimized with respect to an error between the input "x" and the output "y" of the autoencoder, an error in a label related to a state classification, and a difference of a display size so as to calculate the parameter of the autoencoder (Step S47). The input "x" is a matrix which is stored in the first distance data storage unit 115.

A method of calculating the parameter of the autoencoder will be described using FIGS. 16 to 18.

Figure 16:
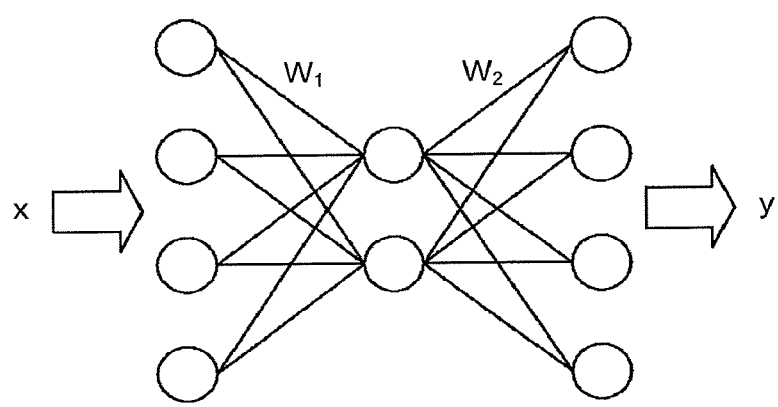
FIG. 16 is a diagram for describing a calculation method of a parameter of the autoencoder.

FIG. 16 is a diagram for describing the error between the input "x" and the output "y" of the autoencoder. In FIG. 16, there is illustrated the autoencoder which outputs "y" with respect to the input "x". The parameter of the encoding in the parameter in the autoencoder is $W_1$, and the parameter of the decoding in the autoencoder is $W_2$. In FIG. 16, $y=W_2W_1x$ is established. In the third embodiment, the parameter of the autoencoder is calculated such that the error (for example, $(y-x)^2$) between the input "x" and the output "y" becomes small.

Figure 17:
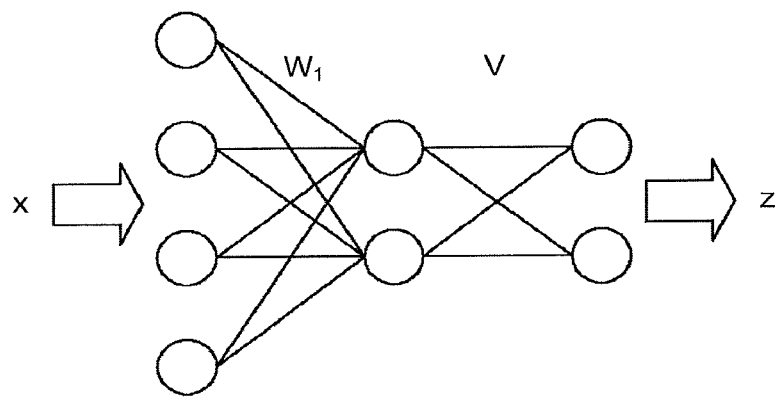
FIG. 17 is a diagram for describing a calculation method of a parameter of the autoencoder.

FIG. 17 is a diagram for describing an error in a label related to the state classification. In FIG. 17, there is illustrated a neural network which outputs "z" with respect to the input "x", the dimensional compression of the first half of the neural network is the same as the encoding in the autoencoder. In the latter half of the neural network, a linear conversion is performed using a matrix V. In FIG. 17, $Z=VW_1x$ is established. The input "x" is associated with different labels t in the case of the column vector corresponding to the sample data set in the first normal state among the column vectors included in the generated matrix and in the case of the column vector corresponding to the sample data set in the second normal state among the column vectors included in the generated matrix. For example, in the former case, the label t is (1, 0), and in the latter case, the label t is (0, 1). In the third embodiment, the parameter of the autoencoder is calculated such that an error (for example, $(z-t)^2$) between the output "z" and the label t of the neural network.

Figure 18:
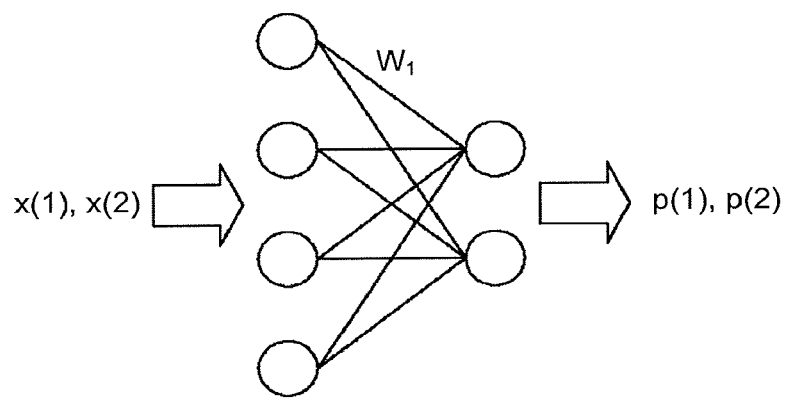
FIG. 18 is a diagram for describing a calculation method of a parameter of the autoencoder.

FIG. 18 is a diagram for describing a difference of a display size. In FIG. 18, there is illustrated a portion of the encoder in the autoencoder illustrated in FIG. 16. The output of the column vector x(1) corresponding to the sample data set in the first normal state is p(1), and the output of the column vector x(2) corresponding to the sample data set in the second normal state is p(2). In the third embodiment, the parameter of the autoencoder is calculated such that an error (for example, $(D_1-D_2)^2$) between a maximum distance (hereinafter, referred to as $D_1$) among the distances of the vectors included in p(1) and a maximum distance (hereinafter, referred to as $D_2$) among the distances of the vectors included in p(2) becomes small. With this configuration, a difference between a size of the distribution of points corresponding to the first normal state and a size of the distribution of points corresponding to the second normal state can be made small, so that it is possible to suppress a difficulty in checking the relation between the data sets.

Therefore, the optimization in Step S47 is expressed by, for example, $f=a_1*(y-x)^2+a_2*(z-t)^2+a_3*(D_1-D_2)^2$, and the parameter of the autoencoder is calculated to minimize "f". Further, $a_1$, $a_2$, and $a_3$ are predetermined weights.

The first generating unit 103 stores the parameter of the encoding (that is, dimensional compression) in the autoencoder among the parameters calculated in Step S47 in the parameter storage unit 119 (Step S49). Then, the process ends.

Figure 19:
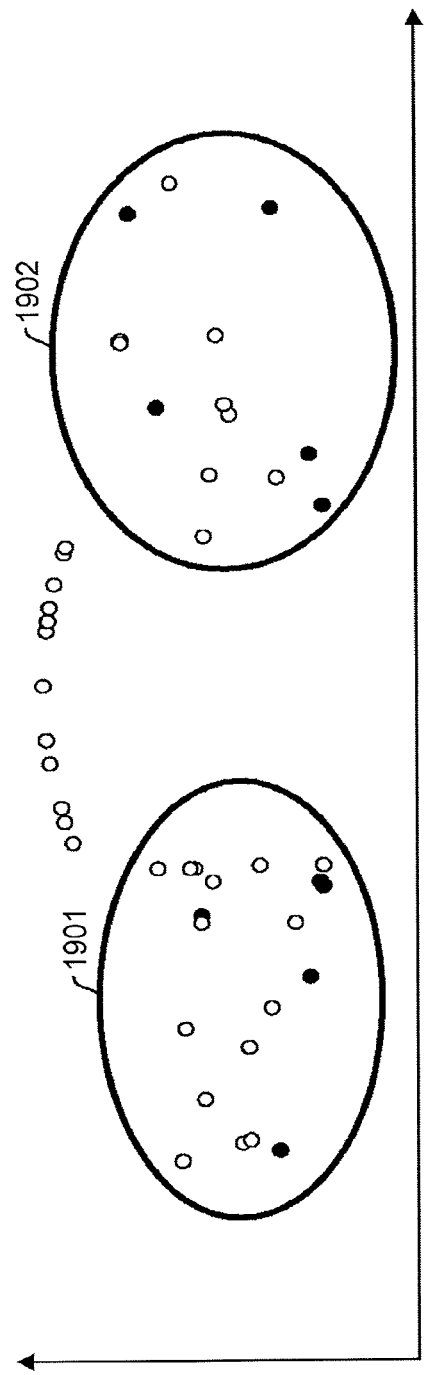
FIG. 19 is a diagram illustrating an example of a display in the third embodiment.

FIG. 19 is a diagram illustrating an example of a display in the third embodiment. The example of FIG. 19 is an example in a case where the vector generated by the dimensional compression is a two-dimensional vector. In FIG. 19, the horizontal axis represents an axis indicating one-dimensional values, and the vertical axis represents an axis indicating two-dimensional values. Points surrounded by a frame 1901 correspond to the data set in the first normal state, and points surrounded by a frame 1902 correspond to the data set in the second normal state. The hatched points among the points surrounded by the frame 1901 and the frame 1902 correspond to the sample data set.

In the example illustrated in FIG. 19, the difference between the size of the region surrounded by the frame 1901 and the size of the region surrounded by the frame 1902 is small compared to the example illustrated in FIG. 12. Therefore, the user easily views the relation between the data sets. In addition, when a point not surrounded by the frame 1901 and not surrounded by the frame 1902 appears, the user can be recognized that the abnormal state is generated.

[d] Fourth Embodiment

The number of abnormal states is two or more, and one of the two or more abnormal states may be already known. In the following, the description will be given about a method of determining whether the abnormal state occurring in the future is a known abnormal state or an unknown abnormal state.

Figure 20:
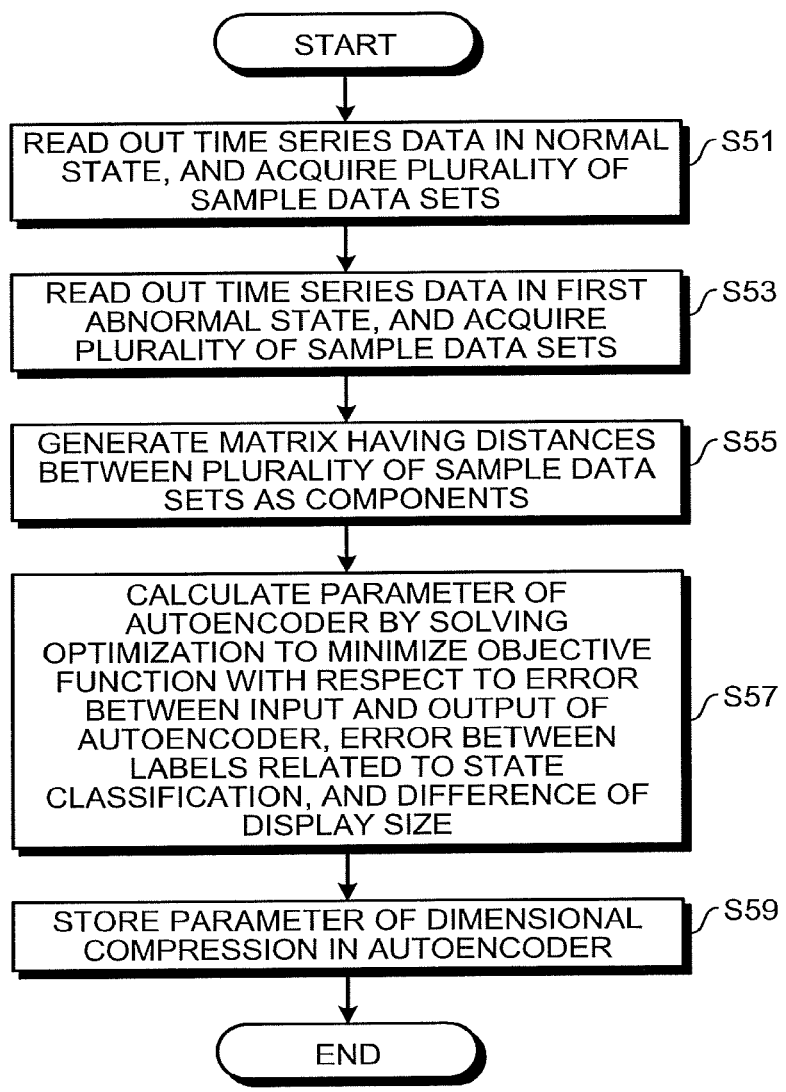
FIG. 20 is a diagram illustrating a processing flow of a process which is performed by a first generating unit in a fourth embodiment.

FIG. 20 is a diagram illustrating a processing flow of a process which is performed by the first generating unit 103 in a fourth embodiment.

First, the first generating unit 103 reads out the time series data in a normal state from the data storage unit 111. Then, the first generating unit 103 acquires the plurality of sample data sets with a large variation from the read-out time series data (FIG. 20: Step S51), and stores the plurality of acquired sample data sets in the first sample data storage unit 131. In Step S51, the first generating unit 103 receives a portion (for example, period) in the normal state which is designated from the user, and reads out the time series data of the designated portion. There may be a plurality of designated portions.

The first generating unit 103 reads out the time series data in a first abnormal state from the data storage unit 111. Then, the first generating unit 103 acquires the plurality of sample data sets with a large variation from the read-out time series data (Step S53), and stores the acquired plurality of sample data sets in the second sample data storage unit 133. In Step S53, the first generating unit 103 receives a portion (for example, period) in the first abnormal state which is designated from the user, and reads out the time series data of the designated portion. There may be a plurality of designated portions.

The first generating unit 103 reads out the plurality of sample data sets acquired in Steps S51 and S53 from the first sample data storage unit 131 and the second sample data storage unit 133. Then, the first generating unit 103 generates a matrix having the distances between the plurality of sample data sets as components (Step S55), and stores the generated matrix in the first distance data storage unit 115.

The first generating unit 103 solves an optimization in which an objective function is minimized with respect to an error between the input "x" and the output "y" of the autoencoder, an error in a label related to a state classification, and a difference of a display size so as to calculate the parameter of the autoencoder (Step S57). The input "x" is a matrix which is stored in the first distance data storage unit 115. In the fourth embodiment, there are used the label associated with the normal state and the label associated with the first abnormal state.

The first generating unit 103 stores a parameter of the encoding in the autoencoder (that is, the dimensional compression) among the parameters calculated in Step S57 in the parameter storage unit 119 (Step S59). Then, the process ends.

With such a process, it is possible to perform the visualization to easily check whether a new abnormality is the same as the existing abnormality.

[e] Fifth Embodiment

Figure 21:
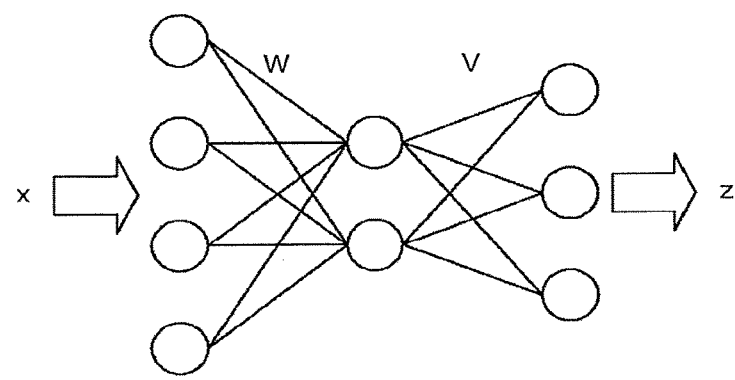
FIG. 21 is a diagram illustrating an example of a neural network in a case where the number of existing states is "3"

The number of existing states are "2" in the third and fourth embodiments. However, the number of known states may be "3" or more. For example, in a case where the number of existing states is "3" or more, the neural network as illustrated in FIG. 21 is used. The neural network illustrated in FIG. 21 is a network which outputs "z" with respect to the input "x", and the number of units of the output layer is "3". Three states are assigned with, for example, the labels (1,0,0), (0,1,0), and (0,0,1). Similarly, when the number of units of the output layer is increased, it is possible to perform an appropriate visualization even in a case where the number of known states is "4" or more.

Hitherto, the embodiment of the invention has been described, but the invention is not limited thereto. For example, the functional block configuration of the visualization device 1 described above may be not matched with an actual program module configuration.

In addition, the order of the processes may be changed even in the processing flow as long as the processing result is not changed. Further, the processes may be performed in parallel.

In addition, the above-described example has been described about the points plotted on the two-dimensional plane, but the points may be plotted on a three-dimensional space.

Further, the above-described visualization device 1 is a computer device. As illustrated in FIG. 22, the memory 2501, the CPU 2503, the HDD 2505, a display control unit 2507 connected to a display device 2509, a drive device 2513 for a removable disk 2511, an input device 2515, and a communication control unit 2517 for the connection to the network are connected by a bus 2519. An operating system (OS) and an application program for performing the process in this embodiment are stored in the HDD 2505, and are read out from the HDD 2505 to the memory 2501 when being performed by the CPU 2503. The CPU 2503 controls the display control unit 2507, the communication control unit 2517, and the drive device 2513 according to a processing content of the application program so as to perform a predetermined operation. In addition, the data in process is mainly stored in the memory 2501, but may be stored in the HDD 2505. In the embodiment of the invention, the application for performing the above-described process is stored in the computer-readable and removable disk 2511 and distributed, and installed in the HDD 2505 from the drive device 2513. The application may be installed in the HDD 2505 through a network such as the Internet and the communication control unit 2517. Such a computer device is configured by hardware such as the CPU 2503 and the memory 2501, the OS, and the program such as the application program in organic cooperation with each other so as to realize various types of functions.

The embodiment of the invention is summed up as follows.

A visualization method according to a first aspect of the embodiment includes a process of (A) generating a plurality of conversion vectors from a plurality of vectors generated from plural pieces of input data by a dimensional compression in which a positional relation between the plurality of vectors, and (B) plotting the plurality of conversion vectors.

Since the positional relation between the plurality of vectors are kept without change, the user who checks the plot can easily check the relation between the input data.

In addition, the visualization method may include a process of (C) generating, from the plural pieces of input data, a vector having a distance between the input data and plural pieces of reference data as components.

With the use of the plural pieces of reference data, it is possible to suppress that input data having different characteristics are considered as the similar input data.

In addition, the dimensional compression may be performed using the conversion rule which is stored in the data storage unit and calculated in advance.

When the dimensional compression is performed using the pre-calculated conversion rule, it is possible to suppress that the positional relation between the plurality of vectors is changed at every time of the dimensional compression.

In addition, the visualization method may include a process of (D) calculating the parameter of the autoencoder which receives the plurality of vectors generated from the plural pieces of reference data, and (E) storing the conversion rule containing an encoding parameter among the parameters of the autoencoder in the data storage unit.

As the dimensional compression, the encoding may be performed in the autoencoder.

In addition, the visualization method may include a process of (F) performing a main component analysis with respect to the plurality of vectors generated from the plural pieces of reference data, and (G) storing the conversion rule included in the result of the main component analysis in the data storage unit.

The conversion rule (for example, the information of the main component vector) of the main component analysis can be used in the dimensional compression.

In addition, in the process of calculating the parameter of the autoencoder, (d1) the optimization may be solved to optimize the objective function based on a difference between the input and the output of the autoencoder, the label information related to the classification of the plurality of states, and the size information of the region where the plurality of vectors generated from the plural pieces of reference data are plotted, so that the parameter of the autoencoder is calculated.

Comprehensively, an appropriate visualization is performed.

In addition, the plurality of states may include at least two normal states.

It is possible to check a relation between at least two normal states.

In addition, the plurality of states may include at least one normal state and at least one abnormal state.

It is possible to check a relation between at least one normal state and at least one abnormal state.

In addition, the plural pieces of reference data may satisfy a condition of the total distance between the plural pieces of reference data.

The data having different characteristics is easily reflected on the visualization result.

A visualization device according to a second aspect of the embodiment may include (H) a conversion unit which generates a plurality of conversion vectors from a plurality of vectors generated from plural pieces of input data by a dimensional compression in which a positional relation between the plurality of vectors is kept (the second generating unit 105 in the embodiment is an example of the conversion unit), and (I) an output unit to plot the plurality of conversion vectors (the output unit 107 in the embodiment is an example of the output unit).

Further, it is possible to create a program for performing the process of the method in a computer. The program may be stored in a computer-readable medium such as a flexible disk, a CD-ROM, a magneto-optical disk, a semiconductor memory, a hard disk or a memory device. Further, a median processing result is temporally stored in the memory device such as a main memory.

In one aspect, data can be visualized such that the relation therebetween can be easily checked.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a visualization program that causes a computer to execute a process comprising:
   generating a vector from each of plural pieces of input data, the vector having distances between the input data and plural pieces of reference data as components;
   generating a plurality of conversion vectors, from the plurality of vectors generated from the plural pieces of input data, by a dimensional compression in a positional relation between the plurality of vectors;
   plotting the plurality of conversion vectors,
   calculating a parameter of an autoencoder having a plurality of vectors as inputs, the vectors being generated from the plural pieces of reference data;
   storing a conversion rule in the data storage, the conversion rule containing an encoded parameter among the parameters of the autoencoder; and
   in the process of calculating the parameter of the autoencoder, calculating the parameter of the autoencoder by analyzing an optimization in which an objective function is minimized based on a difference between an input and an output of the autoencoder, label information related to a classification of a plurality of states, and size information of a region where the plurality of vectors generated from the plural pieces of reference data are plotted,
   wherein the dimensional compression continuously keeps a positional relation between newly acquired data and already acquired data, and
   wherein the dimensional compression is performed using a conversion rule which is stored in a data storage and calculated in advance.

2. The non-transitory computer-readable recording medium according to claim 1, the program causing the computer to further execute a process including:
   performing a main component analysis on a plurality of vectors which are generated from the plural pieces of reference data; and
   storing a conversion rule in the data storage, the conversion rule contained in a result of the main component analysis.

3. The non-transitory computer-readable recording medium according to claim 1, wherein the plurality of states include at least two normal states.

4. The non-transitory computer-readable recording medium according to claim 1, wherein the plurality of states include at least one normal state and at least one abnormal state.

5. The non-transitory computer-readable recording medium according to claim 1, wherein the plural pieces of reference data satisfy a condition on a sum of distances between the plural pieces of reference data.

6. A visualization method comprising:
   generating a vector from each of plural pieces of input data, the vector having distances between the input data and plural pieces of reference data as components,
   generating a plurality of conversion vectors, from the plurality of vectors generated from the plural pieces of input data, by a dimensional compression in a positional relation between the plurality of vectors, by a processor;
   plotting the plurality of conversion vectors,
   calculating a parameter of an autoencoder having a plurality of vectors as inputs, the vectors being generated from the plural pieces of reference data;
   storing a conversion rule in the data storage, the conversion rule containing an encoded parameter among the parameters of the autoencoder; and
   in the process of calculating the parameter of the autoencoder, calculating the parameter of the autoencoder by analyzing an optimization in which an objective function is minimized based on a difference between an input and an output of the autoencoder, label information related to a classification of a plurality of states, and size information of a region where the plurality of vectors generated from the plural pieces of reference data are plotted,
   wherein the dimensional compression continuously keeps a positional relation between newly acquired data and already acquired data, and
   wherein the dimensional compression is performed using a conversion rule which is stored in a data storage and calculated in advance.

7. A visualization device comprising:
   a processor configured to:
   generate a vector from each of plural pieces of input data, the vector having distances between the input data and plural pieces of reference data as components,
   generate a plurality of conversion vectors, from the plurality of vectors generated from the plural pieces of input data, by a dimensional compression in a positional relation between the plurality of vectors;
   plot the plurality of conversion vectors;
   calculate a parameter of an autoencoder having a plurality of vectors as inputs, the vectors being generated from the plural pieces of reference data;
   store a conversion rule in the data storage, the conversion rule containing an encoded parameter among the parameters of the autoencoder; and
   in the process of calculating the parameter of the autoencoder, calculate the parameter of the autoencoder by analyzing an optimization in which an objective function is minimized based on a difference between an input and an output of the autoencoder, label information related to a classification of a plurality of states, and size information of a region where the plurality of vectors generated from the plural pieces of reference data are plotted, wherein the dimensional compression continuously keeps a positional relation between newly acquired data and already acquired data, and wherein the dimensional compression is performed using a conversion rule which is stored in a data storage and calculated in advance.

8. The non-transitory computer-readable recording medium according to claim 1, the program causing the computer to further execute a process including:

generating a vector from each of the plural pieces of input data, the vector having distances between the input data and plural pieces of reference data as components, wherein the dimensional compression is performed using a conversion rule which is stored in a data storage and calculated in advance, wherein the process further includes:

performing a main component analysis on a plurality of vectors which are generated from the plural pieces of reference data; and storing a conversion rule in the data storage, the conversion rule contained in a result of the main component analysis, wherein the result of the main component analysis includes an Eigen value, a contribution rate, and a main component load.

9. The non-transitory computer-readable recording medium according to claim 1, the program causing the computer to further execute a process including:

displaying a vector corresponding to a normal state in a region different from all of the regions where vectors corresponding to a plurality of abnormal states are plotted.

* * * * *